(12) United States Patent　　　　　(10) Patent No.: US 12,557,821 B2

Tychsen　　　　　　　　　　　　　　　(45) Date of Patent: Feb. 24, 2026

(54) KNIFE ASSEMBLY AND APPARATUS AND METHOD FOR PROCESSING ANIMAL PRODUCTS

(71) Applicant: NORDISCHER MASCHINENBAU RUD. BAADER GMBH + CO. KG, Lübeck (DE)

(72) Inventor: Werner Tychsen, Lübeck (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 18/709,738

(22) PCT Filed: Nov. 15, 2021

(86) PCT No.: PCT/EP2021/081620
　　§ 371 (c)(1),
　　(2) Date: May 13, 2024

(87) PCT Pub. No.: WO2023/083469
　　PCT Pub. Date: May 19, 2023

(65)　　　　　　Prior Publication Data

US 2024/0423224 A1　　Dec. 26, 2024

(51) Int. Cl.
　　*A22C 25/00*　　　(2006.01)
　　*A22C 25/16*　　　(2006.01)
(52) U.S. Cl.
　　CPC ................................... *A22C 25/166* (2013.01)
(58) Field of Classification Search
　　CPC ....... A22C 25/166; A22C 25/16; A22C 25/14; A22C 21/003

(Continued)

(56)　　　　　　References Cited

U.S. PATENT DOCUMENTS

| | | | | |
|---|---|---|---|---|
| 4,084,294 | A | * | 4/1978 | Dohrendorf ........... A22C 25/08 |
| | | | | 452/182 |
| 4,688,297 | A | * | 8/1987 | Bartels ................. A22C 21/003 |
| | | | | 452/165 |
| 5,149,297 | A | | 9/1992 | Braeger et al. |

(Continued)

FOREIGN PATENT DOCUMENTS

| | | |
|---|---|---|
| CN | 201957676 U | 9/2011 |
| CN | 102574299 A | 7/2012 |

(Continued)

OTHER PUBLICATIONS

Russian Federation Examination and Search Report dated Nov. 27, 2024 pertaining to RU Federation application No. 2024110776/10(024296) filed Nov. 15, 2021, pp. 1-8.

(Continued)

*Primary Examiner* — Richard T Price, Jr.

(74) *Attorney, Agent, or Firm* — Dinsmore & Shohl LLP

(57)　　　　　　ABSTRACT

A knife assembly for performing, for example, a filleting cut on a slaughtered and gutted fish has at least one cutting head. The cutting head has at least one housing with a knife unit and a drive unit for rotationally driving a knife shaft rotatably borne inside the housing. A separating knife is arranged on a free end of the knife shaft for conjoint rotation. The knife shaft is axially movable relative to the housing and is configured to be decouplable from the drive unit for the purpose of axially moving the knife shaft in such a way that rotational movement of the knife shaft can be performed independently of the axial movement of the knife shaft. An apparatus and a method are disclosed.

32 Claims, 7 Drawing Sheets

(58) Field of Classification Search
USPC ......................................................... 452/161
See application file for complete search history.

(56) References Cited

U.S. PATENT DOCUMENTS

| | | | |
|---|---|---|---|
| 7,927,194 B2 | 4/2011 | Jürs et al. | |
| 8,298,050 B2 | 10/2012 | Jürs et al. | |
| 8,814,637 B2 | 8/2014 | Jürs et al. | |
| 8,956,205 B2 * | 2/2015 | Kowalski ............... | A22C 25/16 |
| | | | 452/135 |
| 9,078,454 B2 | 7/2015 | Jürs | |
| 9,125,424 B2 | 9/2015 | Jürs et al. | |
| 10,264,800 B2 * | 4/2019 | Van Esbroeck ...... | A22C 21/003 |
| 11,006,645 B2 | 5/2021 | Jürs et al. | |
| 2010/0255767 A1 | 10/2010 | Jürs et al. | |
| 2020/0329723 A1 | 10/2020 | Jürs et al. | |

FOREIGN PATENT DOCUMENTS

| | | | |
|---|---|---|---|
| CN | 207464300 U | 6/2018 | |
| CN | 112720366 A | 4/2021 | |
| DE | 2553586 A1 | 8/1976 | |
| DE | 2700068 A1 | 7/1978 | |
| DE | 102020103085 A1 | 8/2021 | |
| EP | 2559506 A2 | 2/2013 | |
| RU | 2449543 C2 | 5/2012 | |
| RU | 2746565 C1 | 4/2021 | |

OTHER PUBLICATIONS

CN First Office Action dated Jul. 25, 2025 pertaining to CN application No. 202180103756.7 filed Nov. 15, 2021, pp. 1-11.

* cited by examiner

KNIFE ASSEMBLY AND APPARATUS AND METHOD FOR PROCESSING ANIMAL PRODUCTS

CROSS-REFERENCE TO RELATED APPLICATIONS

This application is the U.S. National Stage of PCT/EP2021/081620 filed on Nov. 15, 2021, the entire content is incorporated herein by reference in its entirety.

FIELD OF THE INVENTION

The invention relates to a knife assembly, in particular configured and adapted for performing a filleting cut on a slaughtered, beheaded and at least partly gutted fish, comprising at least one cutting head, which comprises at least one housing having a knife unit, and a drive unit configured and adapted for rotationally driving a knife shaft, which has a separating knife and is rotatably borne inside the housing, the separating knife being arranged on the knife shaft, on a free end thereof, for conjoint rotation.

The invention further relates to an apparatus for processing, in particular filleting, animal products, comprising a transport device for holding and transporting the products being processed in the transport direction T along a transport path, and at least one working station along the transport path for processing the animal products.

The invention also concerns a method for processing, in particular filleting, animal products, comprising the steps of: feeding a product that is to be processed to at least one working station by means of a transport device in the transport direction T, performing a processing cut on the product being processed, using a knife assembly as a working station, by transporting the product being processed along at least one rotationally driven separating knife of a cutting head of the knife assembly, the rotating separating knife being axially moved out of a standby position into a cutting position and back again or vice versa in order to be positioned in relation to the product being processed.

BACKGROUND OF THE INVENTION

Knife assemblies and apparatuses of this kind are used in the animal processing industry and in particular for filleting poultry/chicken and fish. In animal processing, and in particular filleting, a multitude of different cuts have to be performed in order to separate the flesh, and in particular the fillets, from the animal or fish skeleton. For this purpose, the products are transported along a transport path in a transport direction T by means of a transport apparatus. At least one working station is arranged along this transport path. Preferably, a plurality of working stations are arranged one behind the other in the transport direction T so that different working steps and in particular (separating) cuts can be performed. Using the example of filleting a slaughtered, beheaded and at least partly gutted fish, working stations are provided for performing filleting cuts, which include belly cuts, flank cuts, flank bone cuts, backbone cuts, pin bone or belly flap cuts, separating cuts and other cuts. The number, configuration, order and arrangement of the working stations can vary depending on the product.

Some of the working stations are configured as knife assemblies, comprising either a single separating knife or a pair of separating knives. The functioning and structural configuration of the knife assembly is basically independent of the product. This means that a generic knife assembly for working a chicken is configured similarly to a corresponding knife assembly for working a fish in terms of the adjustment of the separating knives out of a standby position into a cutting position and back again or vice versa. The or each separating knife or pair of separating knives is configured as a circular knife for performing, for example, belly cuts, flank cuts and in particular also backbone cuts. Each separating knife or circular knife is arranged on a free end of a knife shaft and is positioned and oriented in relation to the product being processed on the basis of the product and in accordance with the cut being performed. Using the example of a backbone cut, each separating knife, which has an oblique orientation, enters the fish from below in such a way that the separating knife sits close to the backbone on one side thereof or, in the case of a pair of separating knives, on both sides thereof such that the backbone is cut away from below as far as to the dorsal fin stems over the entire length of the fish. In the case of a pair of separating knives, the two separating knives form an upside-down V, the two separating knives that form the upside-down V being positioned as upright as possible, at an acute angle to one another, and also sitting as closely as possible to the backbone or even being in direct contact therewith.

A common characteristic among many of these cuts, and explicitly also the flank cuts, the flank bone cuts and in particular the backbone cuts, is that the position of a separating knife in relation to the product being cut may not always be the same since products have both anatomical and individual differences. Fixed separating knives would lead to a poor yield and/or to damage to the products. Purely by way of example and without reducing the invention to this example, in the example of a backbone cut on a slaughtered, beheaded and at least partly gutted fish, fixed separating knives can lead to significant losses in yield if the separating knife is too far away from the backbone. Parts of the flesh would remain as a ligament on the backbone, which absolutely has to be avoided. In the case of fixed separating knives, if the separating knife is too close to the backbone this can lead to the backbone (which can also be referred to as the central bone) being cut into or even cut through, thereby rendering the harvested flesh defective, which likewise absolutely has to be avoided. Accordingly, the position of each separating knife in relation to the product being cut is adjustable in order to set the optimal position of the separating knives in relation to the backbone. The same applies to the separating knives for performing other filleting cuts on fish, chickens or other animals that are suitable and used for processing.

To achieve an optimised cutting pattern, for example to obtain a better yield and/or to achieve a cleaner cut that is gentler on the flesh to be obtained and/or for other reasons, it is necessary to be able to adjust the knife assembly, or at least the or each separating knife of the knife assembly, on the one hand in order to adapt the or each separating knife or the position thereof to the size of the products being processed, and on the other hand in order to move it/them out of a standby position, in which the or each separating knife is arranged at a distance from the product being processed (at a distance from the backbone in the example of the backbone cut), into a cutting position, in which the or each separating knife is in contact with the product (the backbone in the example of the backbone cut), and back again or vice versa. Ultimately, the standby position describes all the positions that are not the actual cutting position.

Different adjustment options for setting the separating knife position in relation to the product being processed are known. For example, the knife assembly, i.e. the entire unit composed of the drive unit and the knife shaft having the separating knife, can be moved out of the standby position into the cutting position and back again by means of a stepper motor or the like. In other variants, pneumatic cylinders or the like are provided for actively controlling the separating knives. Other variants provide for an active or passive spring-loaded adjustment, the adjustment of the passive spring-loaded adjustment being carried out solely in a product-controlled manner.

In the actively controlled systems, large masses have to be moved since the entire knife assembly is moved for the adjustment. As a result, such systems are limited in terms of their dynamic performance. Large masses are slow and accordingly lead to longer adjustment cycles, i.e. a movement out of the standby position into the cutting position and back again or vice versa. In other words, when moving large masses more time is needed to transfer the separating knives out of the standby position into the cutting position, thereby reducing the number of possible cycles and in particular also limiting the service life/durability of such systems. A further disadvantage of the known systems having the large masses to be moved is that only products of a large, commensurate mass are actually able to deflect the separating knives or knife assemblies. Only large products having a particular mass, in particular those weighing more than around 500 g, have a sufficient mass to activate the separating knives or knife assemblies transversely to the transport direction, e.g. counter to a spring force, i.e. to press them outwards, so that the backbone of the product (in the example of a filleting cut on a fish) arrives between the separating knives and, when the products are being transported, the separating knives are in particular guided along the backbone sitting closely thereto but without damaging the backbone. Moreover, only large products are long enough to give the separating knives enough time to perform the actual filleting cut in the cutting position in the time period between moving out of the standby position into the cutting position and back again or vice versa. The known systems are neither suitable nor configured and adapted for processing products of a smaller mass, e.g. weighing less than 500 g, and a shorter length with the required dynamic performance.

Products of a smaller mass, e.g. fish weighing less than 500 g, are unable to activate the heavy mass of entire knife assemblies or the like in order to guide the separating knives along the exterior of the backbone, for example, in a precise and product-controlled manner. The mass of the knife assemblies or other components for controlling the separating knives is so great that they always exert a large force on the product and, as a result, may even damage it. This problem with products of a small mass is a significant one. Moreover, small products of a smaller mass are rather short, so the separating knives only have a short amount of time for the processing, i.e. there is an extremely short period of time left to bring the separating knives into position, and this cannot be achieved with large masses due to the inertia. For the separation (i.e. when performing the separating cut over the entire length of the fish as closely as possible to the backbone in the case of the backbone cut), the separating knives have to be moved out of the standby position into their cutting position in order to then be moved back into the standby position. Accordingly, existing systems are unable to bring the separating knives into position with the corresponding efficiency and the dynamic performance required to process in particular smaller/lighter products having a mass of less than 500 g in a precise and high-yielding manner.

SUMMARY OF THE INVENTION

Therefore, the object of the invention is to create a compact and dynamically adjustable knife assembly that cuts in particular even small products in a reliable, precise and high-yielding manner. The object is furthermore to propose a corresponding apparatus and a corresponding method for filleting animal products.

This object is achieved by a knife assembly of the type mentioned at the outset in that the knife shaft is configured to be axially movable relative to the housing and is configured to be decouplable from the drive unit for the purpose of axially moving the knife shaft, in such a way that the rotational movement of the knife shaft can be performed independently of the axial movement of the knife shaft. As a result, the mass of the knife assembly components that need to be moved in order to bring the separating knives into position is reduced. Owing to the configuration of the knife assembly in accordance with the invention, having a mass-optimised knife shaft and a reduced number of components/parts that are movable for an axial adjustment movement, only the knife shaft having the separating knife is configured and adapted to be axially adjustable relative to the housing when the knife shaft is rotating. The configuration according to the invention creates an extremely dynamically adjustable separating knife. Extremely dynamically describes a system that preferably enables more than 10 movement cycles per second, one movement cycle describing the movement of the separating knife out of the standby position into the cutting position and back again or vice versa. During a movement cycle, a product is worked on the knife assembly before a subsequent product is transported into the region of the knife assembly. Owing to the high dynamic performance, in particular also for light/small products, there is enough time to perform the work, e.g. the filleting cut, the filleting cut along the backbone in the example of the backbone cut, since the mere positioning movements can be performed in a time-optimised manner, namely in particular more quickly. Overall, the configuration according to the invention leads to greater yield efficiency, in particular even with backbone cuts. However, the improved yield efficiency in particular with small/light products is also achieved in other filleting cuts in conjunction with the use of the knife assembly according to the invention.

Advantageously, the knife assembly is configured and adapted for performing a backbone cut on a slaughtered, beheaded and gutted fish that is fed to the knife assembly head-end first. The advantages of the compact, mass-optimised design, as well as the resulting dynamic performance in the control/positioning of the separating knives, are particularly apparent in this filleting cut, especially since the configuration according to the invention makes it possible to achieve axial adjustments even in the range of +/−2 mm and preferably of +/−1 mm dynamically and with adequate sensitivity.

A preferred development of the knife assembly is characterised in that the adjustment force, or an actuator generating the adjustment force, is mechanically decoupled from the knife shaft in order to axially move the knife shaft. The actuator acts on the knife shaft independently of the drive unit. Since the actuator is mechanically decoupled from the knife shaft, the rotational movement from the drive unit to the knife shaft can be performed independently and superimposed on the axial movement of the knife shaft. The masses to be moved during the axial movement are therefore significantly reduced, thereby further improving the dynamic performance during the adjustment of the separating knives.

A particularly preferred embodiment is characterised in that a drive sleeve is arranged on the knife shaft and is operatively connected to the drive unit on the one hand and to the knife shaft on the other hand. This creates a compact arrangement that enables a rotational movement, on the one hand, and an axial movement superimposed thereon, on the other hand.

Advantageously, the knife shaft is arranged and guided inside the drive sleeve in an axially displaceable manner. The movable masses for adjusting/controlling the separating knives are thus reduced to a minimum, thereby improving the dynamic performance.

An advantageous development is characterised in that, on the one hand, a bevel gear of the drive unit is rigidly connected to the drive sleeve in order to rotationally drive the drive sleeve, and, on the other hand, a driver element is rigidly connected to the drive sleeve in order to transmit the rotation of the drive sleeve to the knife shaft. This construction is compact and allows the rotation to be reliably transmitted from the drive sleeve to the knife shaft.

In an expedient embodiment, the knife shaft has a recess in which the driver element engages, the driver element being configured and adapted, on the one hand, to transmit the rotational movement of the drive sleeve to the knife shaft and, on the other hand, to ensure the knife shaft moves axially relative to the drive sleeve. The driver element is preferably a type of slide body that is rigidly connected to the drive sleeve and, on the one hand, establishes the operative connection to the knife shaft, e.g. by a frictional fit, in order to transmit the rotation of the drive sleeve to the knife shaft and, on the other hand, allows the knife shaft to move axially relative to the drive sleeve to a maximum within the bounds of the recess. The axial adjustment path is limited maximally by side walls of the recess, so the side walls form a type of stop for the adjustment path. However, the adjustment path can also be smaller, such that the driver element is always at a distance from the two side walls of the recess. In this case, a stop for limiting the axial adjustment movement can also be formed by stop surfaces of the drive sleeve and of the knife shaft interacting.

Advantageously, the drive sleeve is rotatably borne in the housing and is arranged in the housing so as to be stationary in the axial direction, and the knife shaft is configured to be movable relative to the drive sleeve in the axial direction, the knife shaft and thus the separating knife being held in a cutting position by means of a spring element when the knife assembly is in a starting position, in which cutting position the knife shaft having the separating knife is extended and pressed into an end position against a stop on the drive sleeve. The starting position refers to the position the knife assembly is in immediately before the product being processed reaches the knife assembly. In the starting position, the separating knife is in the maximally extended position. In the event that two separating knives are provided, the separating knives are at the smallest distance from one another in the starting position, which indeed forms the cutting position. The stop can be a projection on the drive sleeve, for example.

A particularly preferred embodiment is characterised in that the actuator for axially moving the knife shaft with respect to the drive sleeve comprises a pneumatic unit, by means of which the adjustment force for axially moving the knife shaft counter to the spring force of the spring element can be applied in such a way that the knife shaft and thus the separating knife are held in a standby position, in which the knife shaft having the separating knife is retracted and pressed into an end position against a stop on the drive sleeve. By means of the pneumatic unit, the axial movement can be controlled particularly simply, and in particular also sensitively, i.e. accurately. In combination with the spring element, which ultimately applies a spring force towards the product being processed, the pneumatic unit allows for an adjustment movement in the axial direction that is highly dynamic and simultaneously easy to modulate, and specifically in both directions towards and away from the product being processed. In particular, the configuration according to the invention allows the separating knife to be activated quickly and precisely, i.e. it enables the axial movement away from the product being processed, as well as enabling the quick and precise adjustment towards the product being processed, with the separating knife coming into contact more gently with the product being processed. The stop that the knife shaft strikes in the retracted position can be a projection on the drive sleeve. The stop can, however, also be the spring element itself or be formed by the spring force of the spring element.

Advantageously, either the spring element is configured and adapted to be replaceable in order to vary the spring force, or the spring force thereof is configured and adapted to be adjustable. This makes it possible to control the dynamic performance. In other words, the sensitivity of the positioning of the separating knife can be varied. With a larger spring force, the knife shaft having the separating knife can be returned to the cutting position more quickly. Yet the separating knives then come into contact with the product more solidly and with greater force. However, a lower spring force may be desirable or required when processing smaller products, for example, in order to reduce the strain on the product. This can be accomplished by using spring elements, in particular compression springs, having different spring forces. In other embodiments, the degree of spring bias and thus the spring force can be varied by varying the length of the spring travel using spacers, for example.

A preferred development is characterised in that the knife shaft is configured at least in two parts, the two knife shaft portions being rigidly but releasably interconnected. Besides the option of configuring the knife shaft as a single part, the multi-part configuration is preferable, with a two-part design being particularly preferable. The two knife shaft portions are arranged non-rotatably with respect to one another. Configuring the knife shaft in multiple parts allows the components used for the axial movement, for example the spring element and the pneumatic unit, to be arranged in a compact manner. In addition, the two-part or multi-part configuration, in a type of modular design, allows the spring element, for example, to be swapped simply and quickly.

Particularly preferably, a first knife shaft portion carries the separating knife, which is preferably configured as a circular knife, and has the recess for the driver element, and a second knife shaft portion is configured in a hollow-cylindrical manner, and a piston rod is arranged in the cavity, the hollow-cylindrical knife shaft portion being connected by means of said piston rod to the knife shaft portion carrying the separating knife. The piston rod arranged in the hollow-cylindrical second knife shaft portion is releasably connected to the first knife shaft portion by means of a screw connection, for example, although other securing systems or fastening means can also be used.

Expediently, the piston rod or its circumferential surface is arranged at a distance from the internal surface of the hollow-cylindrical knife shaft portion in order to form an air chamber, and the piston rod tightly closes the hollow-cylindrical knife shaft portion at the end face on the opposite side to the separating knife. The external diameter of the piston rod is smaller than the internal diameter of the hollow-cylindrical knife shaft portion. This produces an annular air chamber inside the hollow-cylindrical knife shaft portion. To achieve a closed air chamber, the piston rod tightly closes the air chamber at the end face. For this purpose, suitable sealing rings or other sealing means can be used, for example. On the piston rod side facing away from the end face, the air chamber is delimited and closed by walls of the drive sleeve and of the knife shaft.

An advantageous development is characterised in that the air chamber has at least one air flow opening to the surrounding area and is in flow communication with a compressed-air inlet to which a compressed-air unit is connected. Preferably, a plurality of air flow openings are provided, which are distributed, for example, annularly over the circumference of the hollow-cylindrical knife shaft portion. The or each air flow opening is formed in the wall of the hollow-cylindrical knife shaft portion. By means of this or each air flow opening, the air chamber is in flow communication with the compressed-air inlet, which is configured and adapted for feeding in compressed air and carrying it away. The surrounding area describes a region located outside the knife shaft. The region remote from the cavity in the hollow-cylindrical knife shaft portion forms the surrounding area. The compressed-air unit allows compressed air to be injected into the air chamber through the compressed-air inlet and the air flow openings, leading to the knife shaft being pressed into a retracted position (standby position) counter to the spring force of a spring element by the knife shaft pressing against the guide bush. As soon as the adjustment force is greater than the spring force, the knife shaft is adjusted axially inwards so that the distance from the separating knives to the product increases. Thus, the knife shaft having the separating knife is in the standby position. As soon as the pressure in the compressed-air unit is reduced or removed, the compressed air can escape from the air chamber through the air flow openings and the compressed-air inlet. As the pressure is released, the spring element presses the knife shaft axially outwards towards the product being processed as soon as the spring force is greater than the adjustment force. As soon as the knife shaft having the separating knife is axially extended, the knife shaft having the separating knife is in the cutting position.

Expediently, the compressed-air inlet comprises a rotary union for the compressed air, which is to be controlled, through the or each air flow opening into the air chamber and out of the air chamber. This achieves a disruption-free and compact configuration of the knife assembly, by means of which the rotational movement of the knife shaft can be performed in a manner superimposed on the axial movement of the knife shaft.

In a particularly advantageous embodiment, on the knife shaft side facing away from the separating knife, a second air chamber is formed between the end face of the hollow-cylindrical knife shaft portion (or the piston rod that closes the shaft end) and the housing and is in flow communication with a second compressed-air inlet to which a compressed-air unit is connected. The compressed air acts in the direction of the spring force of the spring element to transfer the knife shaft back to the cutting position, i.e. into the extended position, more quickly after having been activated into the standby position, i.e. after the retraction of the knife shaft. The compressed-air unit assists the spring element, so to speak, with a pulse-like compressed-air control preferably being provided in such a way that extending the knife shaft back into the cutting position initially generates a pulse of compressed air which, however, preferably ends before the separating knife comes into contact with the product. The final cutting position of the separating knives on the product is then reached owing to the spring element. With this embodiment, the dynamic performance of the adjustment of the separating knives can be further increased since less time is needed to retract and, in particular, to extend the knife shaft. In addition, in this way the pressure forces of the separating knives on the product can be variably adapted in a simple manner.

In a further advantageous embodiment, the drive sleeve is formed at least in two parts, the two drive sleeve portions being rigidly but releasably interconnected. Besides the option of configuring the drive sleeve as a single part, the multi-part configuration is preferable, a two-part design composed of two drive sleeve portions being particularly preferable. The two drive sleeve portions are configured substantially in a hollow-cylindrical manner and enclose the two knife shaft portions. A first drive sleeve portion is preferably and substantially arranged in the region of the first knife shaft portion. A second drive sleeve portion is preferably and substantially arranged in the region of the second, hollow-cylindrical knife shaft portion. The two drive sleeve portions are arranged non-rotatably with respect to one another, preferably via a releasable screw connection. Other securing systems or fastening means can likewise be used. Configuring the drive sleeve in multiple parts allows the components used for the axial movement, for example the spring element, to be arranged in a compact manner.

Advantageously, a first drive sleeve portion carries the bevel gear and the driver element, and a second drive sleeve portion forms a clearance, in which at least the spring element is arranged, at least in some portions between itself and the hollow-cylindrical knife shaft portion. In addition to the or each spring element, banks of springs can also be used, and spacers or spacer rings can preferably also be arranged in the clearance. Preferably, spacer rings are placed on the outer circumference of the hollow-cylindrical knife shaft portion in order to adjust the length of the spring travel of the spring element. The spring element is supported on a projection on the drive sleeve on the one hand, either directly or indirectly, for example on the spacers, and on a projection on the hollow-cylindrical knife shaft portion on the other hand.

An expedient development is characterised in that at least one lubricant outlet is provided, which is arranged, in order to protect the axial adjustment region of the knife shaft, in a region of the knife shaft in which the knife shaft emerges from the housing and carries the separating knife. Optionally, at least one second lubricant outlet can also be provided, which is preferably arranged in the region of the opposite end of the knife shaft to the separating knife. The or each lubricant outlet forms, so to speak, a protective curtain and prevents dirt particles and other nuisance particles from entering the region of the axial guidance of the knife shaft and drive sleeve.

In a particularly preferred embodiment, the knife assembly is characterised in that the knife assembly comprises two cutting heads. The two cutting heads are built in the same way as previously claimed and can be controlled individually or in synchronisation. When the knife assembly is in a starting position, with the two separating knives in the cutting position, there is a gap between the two separating knives. The size of said gap is automated by the axial adjustment and can be varied during operation of the knife assembly.

The object is also achieved by a filleting apparatus having the features referred to at the outset in that the working station is a knife assembly configured and adapted as disclosed herein.

Preferably, the apparatus is configured for processing slaughtered, beheaded and at least partly gutted fish that are being transported in the transport direction T head-end first. In other embodiments, however, the knife assembly can also be arranged along a transport device that is configured and adapted for transporting fish tail-end first.

Expediently, one cutting head of the knife assembly is arranged on either side of the transport path, the two cutting heads being configured to be controllable either in synchronisation or separately from one another. As a result, products, and in particular also fish being transported in their longitudinal extension, can be processed precisely and effectively.

The apparatus advantageously comprises a control unit, which is configured and adapted for controlling the transport device and the or each working station. This ensures that the products are processed precisely and efficiently.

An advantageous development of the apparatus is characterised in that the transport device comprises a conveying means, which is configured selectively as a conveyor belt, a double conveyor belt, a conveyor chain comprising holding means, a spike chain, an overhead conveyor system or the like.

In addition to the knife assembly, a plurality of working stations are advantageously arranged along the transport path and are arranged either upstream or downstream of the knife assembly in the transport direction T.

The resulting advantages have already been described in connection with the knife assembly, so reference will be made to the above passages to avoid repetition.

Furthermore, the object is achieved by a method having the steps referred to at the outset in that, for the axial adjustment of the separating knife superimposed on the rotational movement of the separating knife, only a knife shaft carrying the separating knife is moved relative to a housing of the cutting head of the knife assembly. Unlike in the prior art, only a few components, namely the components needed for positioning the separating knife in relation to the product, for example the knife shaft having the separating knife, are axially moved, whereby a mass-optimised positioning is accomplished and the dynamic performance is improved.

Advantageously, the processing steps are carried out either in synchronisation or in a temporally staggered manner on both sides of the product by transporting along the product being processed between two rotationally driven separating knives of two cutting heads of the knife assembly that are arranged on opposite sides of the product being processed. The product can be processed on both sides in both a temporally staggered and spatially offset manner. Preferably, a product is processed on both sides temporally and spatially in parallel.

In a preferred procedure, in principle, each separating knife is held in a cutting position as a result of the knife shaft that carries the separating knife being moved out of the housing in the axial direction by a spring force, each separating knife for performing the processing cut first being moved axially into a standby position counter to the spring force by the knife shaft that carries the separating knife being moved into the housing in the axial direction by means of compressed air, and each separating knife being moved, owing to the reduction and release of the compressed air, back into the cutting position as soon as the product being processed is in the correct position in relation to the separating knife in the transport direction T, by the knife shaft that carries the separating knife being moved out of the housing in the axial direction by the spring force. Owing to the spring force in the starting position, the separating knife waits in the cutting position, in which the distance from the separating knife to the product is the smallest. Shortly before the product being processed is transported into the work area/operating area of the separating knife, the adjustment force, which is generated by the compressed air and counteracts the spring force, leads to the separating knife moving axially, which leads to an increase in the distance from the product being processed. The separating knife is thus moved into the standby position. When the leading end of the product reaches the level of the separating knife (referred to as the correct position of the separating knife in relation to the product; in the case of two separating knives, the correct position is reached when the product being processed is located between the two separating knives by its leading end), said separating knife is then moved closer to the product again into the cutting position from the side by the spring force to perform the actual processing cut.

On the one hand, the separating knife is made to move out of the standby position into the cutting position by the spring force as soon as the spring force is greater than the adjustment force/counterforce generated by the compressed air. On the other hand, the return position back into the cutting position, brought about by the spring force, can be assisted at least initially by compressed air acting in the direction of the spring force.

Particularly preferably, the method is characterised in that a backbone cut is performed on a slaughtered, beheaded and at least partly gutted fish using two separating knives of the knife assembly by transporting the fish being processed, head-end first, into the region of the separating knives, which are in a cutting position, and moving the separating knives away from one another counter to the spring force of a spring element using compressed air before the backbone of the fish arrives between the separating knives, and then moving said separating knives towards one another again, at least using the spring force, as soon as the backbone is located between the separating knives, the separating knives then sliding along the backbone in contact therewith at an adjustable and constant pressure as a result of the spring force.

For an automated method, it is particularly advantageous for the transport device and the or each working station to be controlled by means of a control device.

The resulting advantages have already been described in connection with the knife assembly, so reference will be made to the above passages to avoid repetition.

BRIEF DESCRIPTION OF THE DRAWINGS

Further expedient and/or advantageous features and developments of the knife assembly, the apparatus and the method for filleting animal products emerge from the description. Particularly preferred embodiments of the knife assembly and of the apparatus and method are explained in greater detail with reference to the accompanying drawing. The drawing shows.

DETAILED DESCRIPTION OF THE INVENTION

Figure 1:
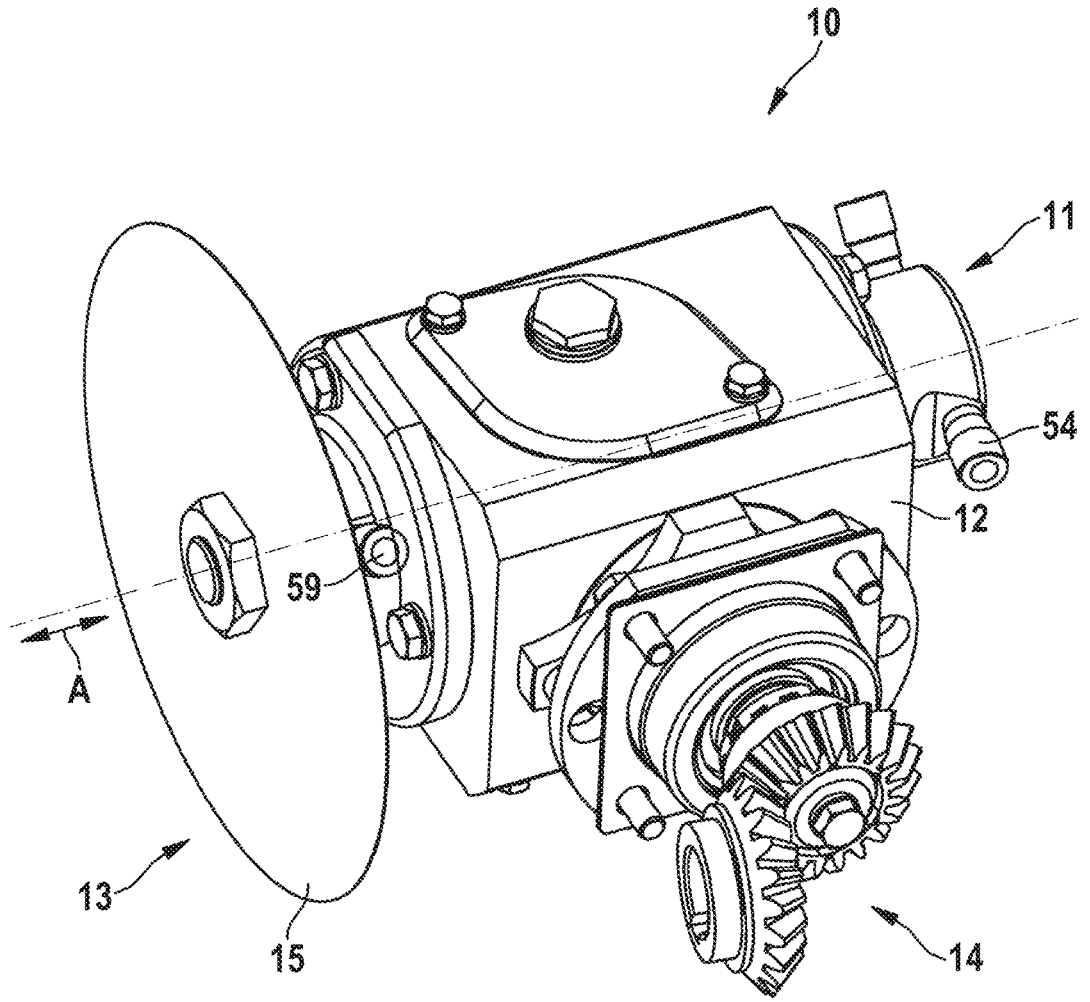
FIG. 1 a schematic view of a knife assembly comprising a cutting head in perspective view obliquely from above and the front.
Figure 2:
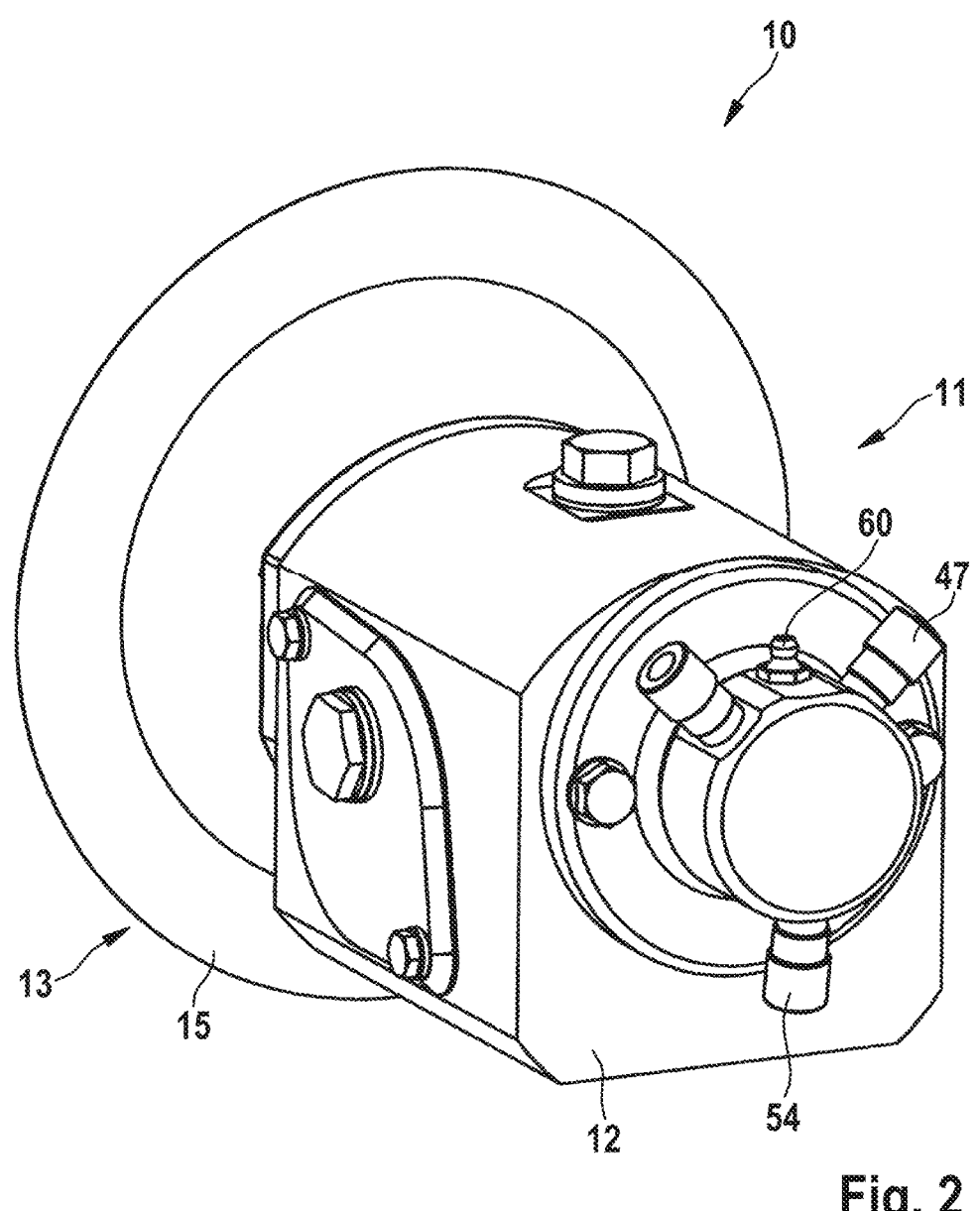
FIG. 2 the cutting head according to FIG. 1 obliquely from behind.
Figure 3:
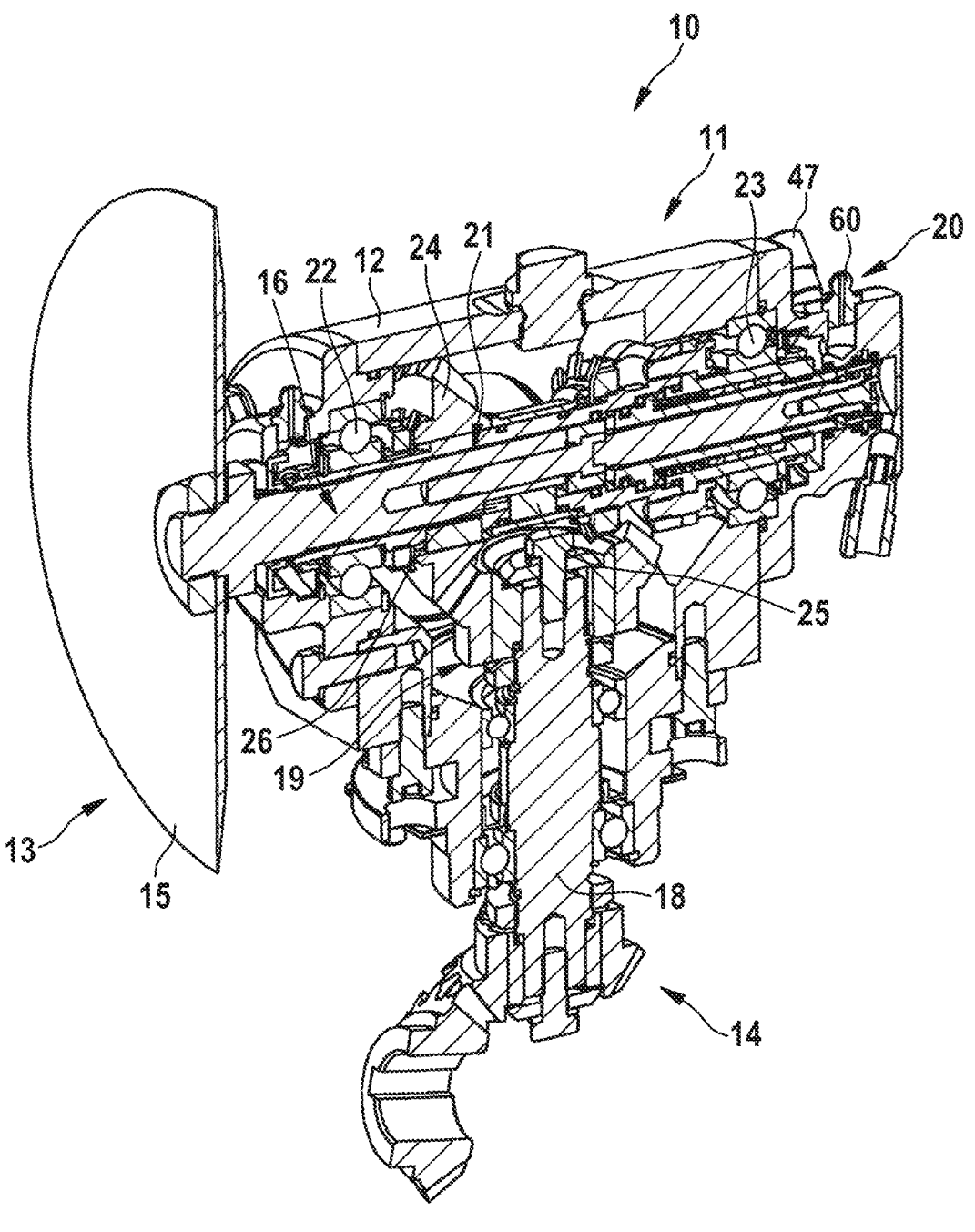
FIG. 3 a sectional view of the cutting head according to FIG. 1.
Figure 4:
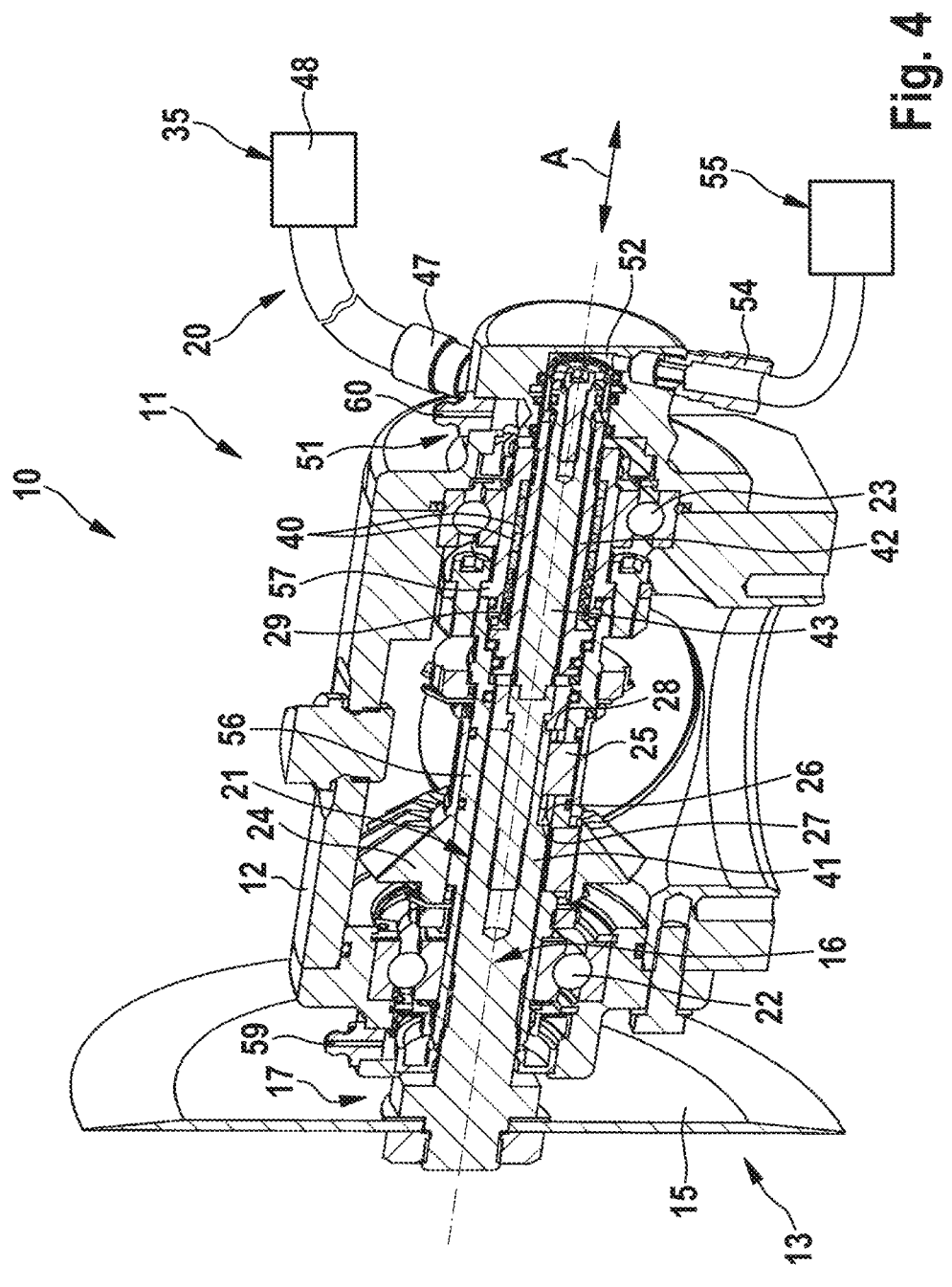
FIG. 4 an enlarged view of the sectional view according to FIG. 3.

The knife assembly shown in the drawing and the apparatus are used for cutting free the backbone down to the dorsal fin stems over the entire length of a slaughtered, beheaded and at least partly gutted fish, and are configured and adapted accordingly. Said cut, which is known as a backbone cut or also a stalk cut, describes a suitability and configuration of the knife assembly purely by way of example. It goes without saying that the knife assembly and the apparatus are configured and adapted accordingly to, for example, perform a flank bone cut or a separating cut in a filleting process of a fish. The knife assembly according to the invention and the apparatus are equally configured and adapted, and accordingly suitable, for filleting other animal products, for example for filleting and/or deboning slaughtered chickens or the like.

The knife assembly 10 shown is configured and adapted in particular for performing a filleting cut on a slaughtered, beheaded and at least partly gutted fish 100 and comprises at least one cutting head 11, which comprises at least one housing 12 having a knife unit 13, and a drive unit 14 configured and adapted for rotationally driving a knife shaft 16, which has a separating knife 15 and is rotatably borne inside the housing 12, the separating knife 15 being arranged on the knife shaft 16, on a free end 17 thereof, for conjoint rotation. The knife shaft 16 having the separating knife 15 is part of the knife unit 13.

According to the invention, this knife assembly 10 is characterised in that the knife shaft 16 is configured to be axially movable relative to the housing 12 and is configured to be decouplable from the drive unit 14 for the purpose of axially moving the knife shaft 16, in such a way that the rotational movement of the knife shaft 16 can be performed independently of the axial movement of the knife shaft 16. During the separation process, the separating knife 15 is driven in a circulating and rotational manner, preferably constantly. The axial movement is temporary for the purpose of moving the separating knife 15 out of a standby position into a cutting position and/or vice versa, to either increase or reduce the distance from the separating knife 15 to the product being processed. The knife shaft 16 is decoupled from the drive unit 14 in relation to the axial movement at least in the situations in which the axial movement is superimposed on the rotational movement.

Whether taken on their own or in combination with each other, the features and developments described below illustrate preferred embodiments. It is explicitly noted that features combined in the description and/or the drawings or described in a common embodiment can also refine the above-described knife assembly 10 in a functionally independent manner.

As already mentioned, the invention will be described on the basis of the processing of a fish 100, which is shown schematically on the basis of a fish skeleton, the processing being explained using the example of a flank bone cut. In the embodiment shown, the knife assembly 10 is configured and adapted for performing a backbone cut on a slaughtered, beheaded and gutted fish 100 that is fed to the knife assembly 10 head-end first. The flank bone cut is a filleting cut in which the separating knives 15 cut free the backbone from below down to the dorsal fin stems over the entire length of the fish, after the flank bones have been separated from the backbone beforehand such that the backbone forms a type of stalk; for this reason, a stalk cut is also referred to. The drive unit 14, only shown in part in the drawing, can be configured in different ways. By way of example, the drive unit 14 comprises a drive motor (not shown), a drive shaft 18 and at least one angular gear 19. It goes without saying that other drive units 14 can also be used.

The cutting head 11 comprises an actuator 20. The actuator 20 is configured and adapted for performing or triggering the axial movement of the knife shaft 16. The adjustment force, or an actuator 20 generating the adjustment force, is mechanically decoupled from the knife shaft 16 in order to axially move the knife shaft. In the embodiment being described, for the actuator 20 to be able to trigger an axial movement of the knife shaft 16 independently of, or superimposed on, the rotational movement of the knife shaft 16, a drive sleeve 21 is arranged on the knife shaft 16 and is operatively connected to the drive unit 14 on the one hand and to the knife shaft 16 on the other hand. The drive sleeve 21 is rotatably borne in the housing, for example by means of two ball bearings 22, 23. The knife shaft 16 is arranged and guided inside the drive sleeve 21 in an axially displaceable manner. For this purpose, a sliding guide, a sliding film or the like is arranged or formed at least in some portions between the external peripheral surface of the knife shaft 16 and the internal surface of the drive sleeve 21. To transmit the drive movement of the drive unit 14 to the drive sleeve 21, a bevel gear 24 of the drive unit 14 is rigidly connected to the drive sleeve 21 on the one hand in order to rotationally drive the drive sleeve 21. To transmit the rotation of the drive sleeve 21 to the knife shaft 16, a driver element 25 is rigidly connected to the drive sleeve 21 on the other hand.

The driver element 25 engages in the knife shaft 16 in order to establish an operative connection. For this purpose, the knife shaft 16 has a recess 26 in which the driver element engages. The dimensions of the recess 26 can vary. In the axial direction (i.e. in the direction of the axial adjustment movement A), the recess 26 is larger than the driver element 25. In other words, side walls 27, 28 of the recess 26 are arranged at a distance from the driver element 25, namely at least 1 mm away in each case, to enable the axial movement in both adjustment directions A. In the embodiment shown, the driver element 25 is a slide block that is configured and adapted for transmitting the rotation of the drive sleeve 21 to the knife shaft 16, on the one hand, and also configured and adapted for allowing the knife shaft 16 to move axially relative to the drive sleeve 21, on the other hand. Other solutions and configurations of the driver element 25 for performing this dual function can also be used.

As described above, the drive sleeve 21 is rotatably borne in the housing 12 and is arranged in the housing 12 so as to be stationary in the axial direction. In addition to the bearing of the drive sleeve 21, sealing means are provided between the external peripheral surface of the drive sleeve 21 and components of the drive unit 14 and/or of the housing 12 that are in contact with said external peripheral surface. The knife shaft 16 is configured to be movable relative to the drive sleeve 21 in the axial direction, the knife shaft 16 and thus the separating knife 15 being held in a cutting position by means of a spring element 29 when the knife assembly 10 is in a starting position, in which cutting position the knife shaft 16 having the separating knife 15 is extended and pressed against a stop 30 on the drive sleeve 21. In principle, the knife shaft 16 having the separating knife 15 is in an extended position when in the cutting position. The spring element 29 is pressed against a projection 31 on the axially stationary drive sleeve 21 and is in contact with a projection 32 on the knife shaft 16 such that the knife shaft 16 is kept axially pressed against a stop surface 33 of the drive sleeve 21. A sealing and/or damping means 34 can be arranged between the projection 32 on the knife shaft 16 and the stop surface 33 of the drive sleeve 21.

The actuator 20 for performing or triggering the axial adjustment movement can be configured in a motorised manner, for example. In the embodiment shown, the actuator 20 for axially moving the knife shaft 16 with respect to the drive sleeve 21 comprises a pneumatic unit 35, by means of which the adjustment force for axially moving the knife shaft 16 counter to the spring force of the spring element 29 can be applied in such a way that the knife shaft 16 and thus the separating knife 15 are held in a standby position, in which the knife shaft 16 having the separating knife 15 is retracted and pressed against a stop 36 on the drive sleeve 21. The stop 36 is formed by a projection 37 on the drive sleeve 21, which provides a stop surface 38. A sealing and/or damping means 39 can be arranged between the projection 32 on the knife shaft 16 and the stop surface 38 of the drive sleeve 21.

The spring element 29, which is arranged on the external circumferential surface of the knife shaft 16, is supported, as mentioned, between the projection 32 on the knife shaft 16 and the projection 31 on the drive sleeve 21, at least one spacer ring 40, preferably a plurality of spacer rings 40, being arranged between the spring element 29 and the projection 31 on the drive sleeve 21. The number of spacer rings 40 can be changed in order to vary the spring force and/or the spring travel. The spring element 29 can optionally also be swapped in order to vary the spring force, which is made simpler by a modular construction. For this purpose, among other things, the knife shaft 16 is formed at least in two parts, the two knife shaft portions 41, 42 being rigidly but releasably interconnected. The two knife shaft portions 41, 42 are screwed non-rotatably with respect to one another. A first knife shaft portion 41 carries the separating knife 15, which is preferably configured as a circular knife, and has the recess 26 for the driver element 25. A second knife shaft portion 42 is configured in a hollow-cylindrical manner, and a piston rod 43 is arranged in the cavity, the hollow-cylindrical knife shaft portion 42 being connected by means of said piston rod to the knife shaft portion 41 that carries the separating knife 15. The assignment of the individual components to each knife shaft portion 41, 42 can of course vary. The connection between the two knife shaft portions 41, 42 is established by a screw connection by means of the piston rod 43, but it can also be established in a different way, for example by plug-in connections and/or clamping or latching connections.

Preferably, the piston rod 43 is arranged wholly inside the hollow-cylindrical knife shaft portion 42. The piston rod 43, or its circumferential surface, is arranged at a distance from the internal surface of the hollow-cylindrical knife shaft portion 42 in order to form an air chamber 44. For this purpose, the external diameter of the piston rod 43 is smaller than the internal diameter of the hollow-cylindrical knife shaft portion 42. The piston rod 43 tightly closes the hollow-cylindrical knife shaft portion 42 at the end face on the opposite side of the knife shaft 16 to the separating knife 15. For this purpose, suitable sealing means 45 are used. The air chamber 44 has at least one air flow opening 46 to the surrounding area and is in flow communication with a compressed-air inlet 47 to which a compressed-air unit 48 is connected. The compressed-air unit 48 comprises a compressed-air pump and lines for feeding compressed air in and carrying it away and is part of the actuator 20. In the wall of the hollow-cylindrical knife shaft portion 42, there are arranged, distributed over the circumference, a plurality of bores which are used for feeding compressed air into the air chamber 44 and for carrying compressed air out of the air chamber 44 through the compressed-air inlet 47.

The air chamber 44 extends from the or each air flow opening 46 along the piston rod 43 in the interstice between the piston rod 43 and the hollow-cylindrical knife shaft portion 42 in the direction of the separating knife 15 as far as to an opening 49 that opens into a cavity 50 defined by the drive sleeve 21 and the knife shaft 16. The axially movable knife shaft 16 can be pressed relative to the drive sleeve 21 by compressed air that flows into the air chamber 44, and specifically counter to the spring force of the spring element 29. Since the knife shaft 16 is rotationally driven, the compressed-air inlet 47 comprises a rotary union 51 for the compressed air, which is to be controlled, through the or each air flow opening 46 into the air chamber 44 and out of the air chamber 44.

In addition to the first air chamber 44 inside the hollow-cylindrical knife shaft portion 42, a second air chamber 52 located outside the knife shaft 16 is provided, namely on the side of the knife shaft 16 facing away from the separating knife 15. The second air chamber 52 is formed between the end face 53 of the hollow-cylindrical knife shaft portion 42 and the housing 12 and is in flow communication with a second compressed-air inlet 54. A compressed-air unit 55 is connected to the compressed-air inlet 54. The compressed-air unit 55 comprises a compressed-air pump and lines for feeding compressed air in and carrying it away and is part of the actuator 20. The compressed-air units 48, 55 can also be combined together to form a joint compressed-air unit. The compressed-air unit 55 can optionally also be expanded, for example by a proportional valve. A spring action can be obtained in this way, and so the spring element 29 could be foregone.

In the embodiment shown, not only is the knife shaft 16 configured in two parts, but the drive sleeve 21 is also configured at least in two parts, the two drive sleeve portions 56, 57 being rigidly but releasably interconnected. For this purpose, screw connections are preferably provided. The two drive sleeve portions 56, 57 are screwed non-rotatably with respect to one another. Both drive sleeve portions 56, 57 are configured to be hollow. A first drive sleeve portion 56 carries the bevel gear 24 and the driver element 25. A second drive sleeve portion 57 forms a clearance 58, in which at least the spring element 29 is arranged, at least in some portions between itself and the hollow-cylindrical knife shaft portion 42. In the embodiment shown, the spacer rings 40 are also arranged next to the spring element 29 in the clearance 58 formed between the second drive sleeve portion 57 and the second knife shaft portion 42.

Preferably, at least one lubricant outlet 59 is provided in the knife assembly 10 and is arranged, in order to protect the axial adjustment region of the knife shaft 16, in a region of the knife shaft 16 in which the knife shaft 16 emerges from the housing 12 and carries the separating knife 15. In the embodiment shown, a second lubricant outlet 60 is provided. The or each lubricant outlet 59, 60 forms, so to speak, a protective curtain and prevents dirt particles, water and other nuisance particles from entering the region of the axial guidance of the knife shaft 16 and drive sleeve 21.

Figure 5:
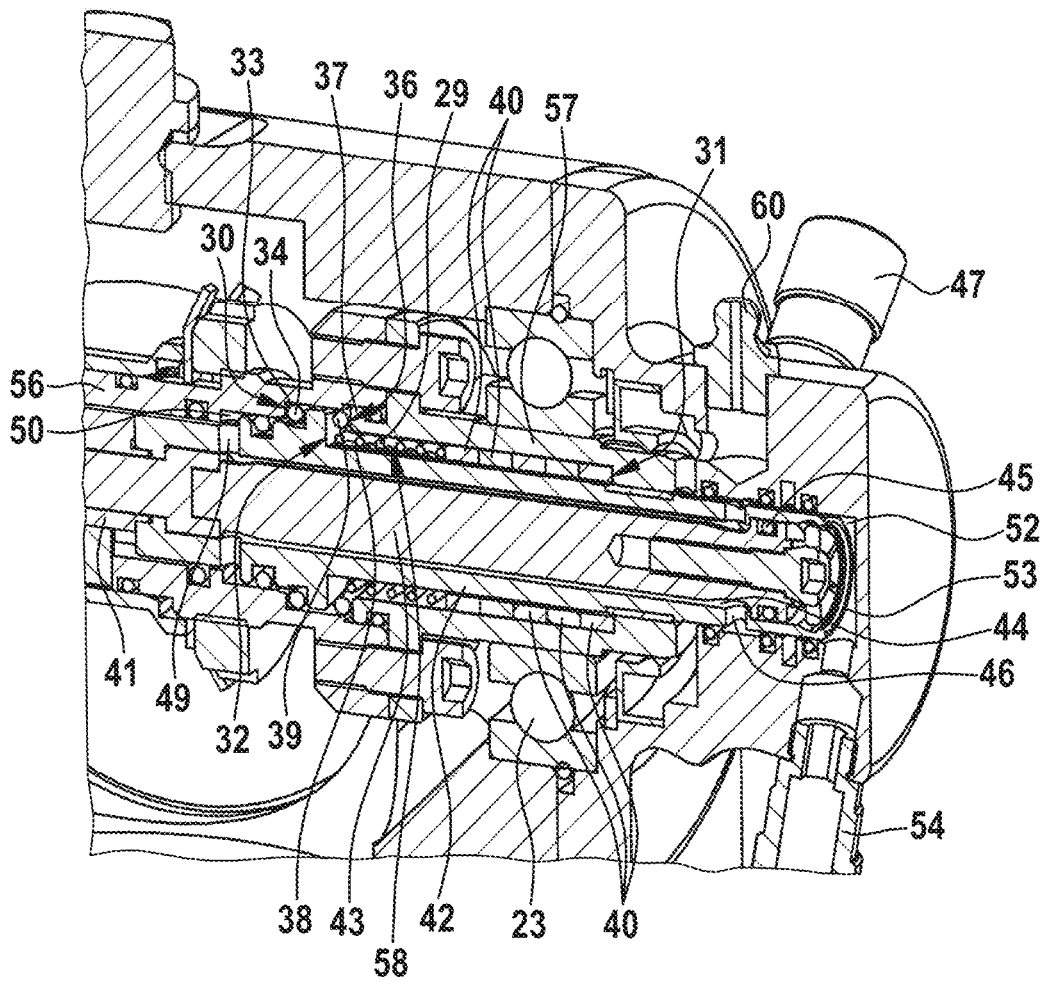
FIG. 5 an enlarged view of portions of the cutting head in section.
Figure 6:
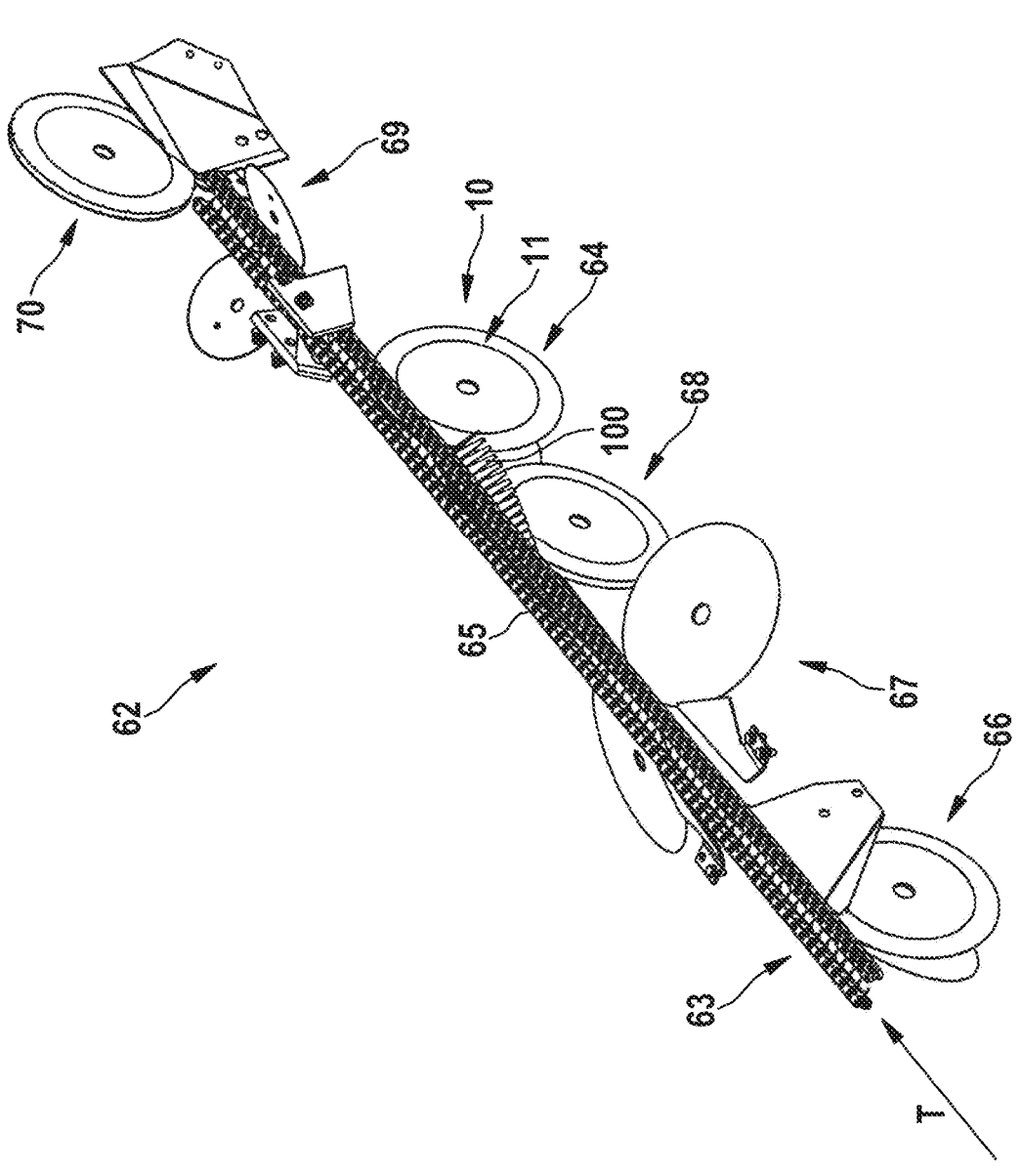
FIG. 6 a schematic view of an apparatus for processing fish, comprising a knife assembly having two cutting heads or a pair of separating knives, obliquely from above.
Figure 7:
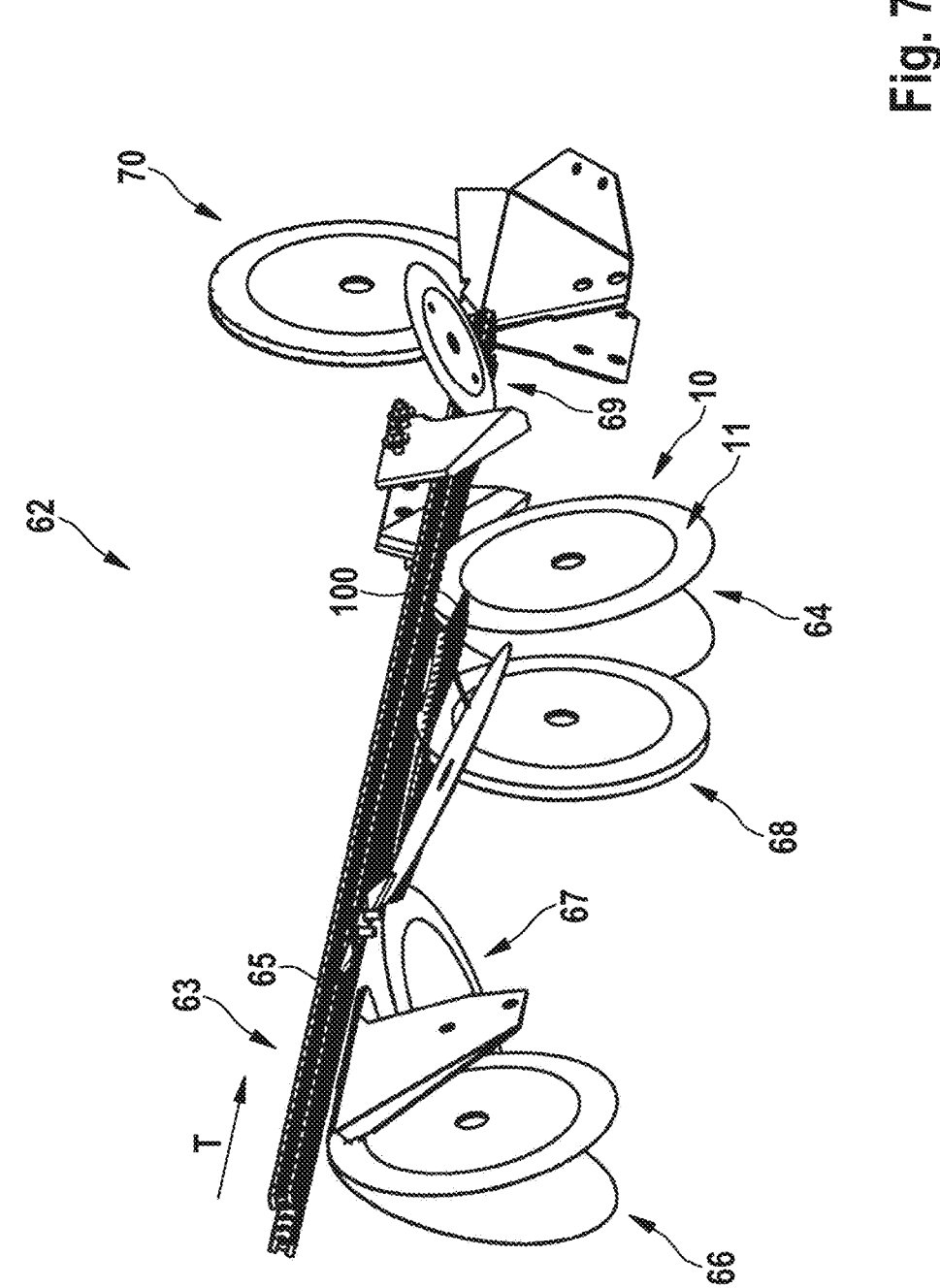
FIG. 7 the apparatus according to FIG. 6 obliquely from below.

So far, the knife assembly 10 has been described having only one cutting head 11. In preferred embodiments, the knife assembly 10 comprises two cutting heads 11, 61, which are indicated highly schematically in FIGS. 5 and 6 by the respective separating knives 15. The two cutting heads 11, 61 are built in the same way as described above and can be controlled individually or in synchronisation. In a starting position, with the separating knives 15 in the cutting position, there is a gap between the two separating knives 15, which corresponds approximately to the thickness of the product being cut or, in the example of the backbone cut, to the thickness of the backbone.

The knife assembly 10 can be configured as an individual unit, an exchangeable unit or a replacement unit. Preferably, however, the knife assembly 10 is part of a superordinate apparatus 62, namely preferably an apparatus 62 for processing, in particular filleting, animal products, comprising a transport device 63 for holding and transporting the products being processed in the transport direction T along a transport path, and at least one working station 64 along the transport path for processing the animal products.

According to the invention, this working station 64 is characterised in that the working station 64 is a knife assembly 10, which is configured and adapted as disclosed herein. In the embodiment shown, the apparatus 62 is configured for processing slaughtered, beheaded and at least partly gutted fish 100 that are being transported in the transport direction T head-end first. To perform the backbone cut, one cutting head 11, 61 of the knife assembly 10 is arranged on either side of the transport path, the two cutting heads 11, 61 being configured to be controllable either in synchronisation or separately from one another. To control the transport device 63 and the or each working station 64, the apparatus 62 comprises a control unit. In the apparatus 62 shown, the transport device 63 is a spike chain 65, which comprises two chain elements driven in a circulatory manner. Each chain element has spikes, which are turned towards each other in the region in which the two chain elements receive the fish 100 being processed between each other, in such a way that the fish 100 is held on both sides and transported. Instead of the spike chain 65, conveyor belts, double conveyor belts, conveyor chains having transport saddles, overhead conveyor systems or the like can be used as conveying means.

Particularly preferably, in addition to the knife assembly 10 as a working station 64, the apparatus 62 comprises further working stations 66 to 70 in order to provide a complete, automated filleting process. In the example of filleting a fish 100, a plurality of working stations 66 to 70 are arranged along the transport path and are arranged either upstream or downstream of the knife assembly 10 in the transport direction T. Upstream of the knife assembly 10 in the transport direction T, knife assemblies for performing a belly cut, a flank cut and a flank bone cut can be provided, for example. Downstream of the knife assembly 10 in the transport direction T, knife assemblies 10 for performing a pin bone cut and a separating cut can be provided. It goes without saying that further working stations can be provided along the transport path. In principle, all the knife assemblies 10 are configured and adapted to be adjustable. An axial adjustment of the separating knives 15 transversely to the transport direction T in order to move the separating knives 15 closer to or further away from the product can be carried out in the manner according to the invention by configuring and adapting the knife assemblies 10 accordingly, as described by way of example in relation to the knife assembly 10 for performing the backbone cut.

The method according to the invention is explained in greater detail on the basis of the drawing:

The invention relates to a method for processing, in particular for filleting, animal products. Chicken and fish 100 in particular are designated as products to be processed, although other animals to be processed or products suitable for consumption can explicitly also be processed using the method according to the invention. In the method, products to be processed are transported to at least one working station 64 by means of a transport device 63 in the transport direction T. At the working station 64, a processing cut is performed on the product being processed by the product that is being processed being moved through the working station 64 and reaching the work area/operating area of a separating knife 15 of a knife assembly 10 as the working station 64, i.e. by said product being transported along at least one rotationally driven separating knife 15 of the cutting head 11 of the knife assembly 10. To position the rotating separating knife 15 in relation to the product being processed, the separating knife 15 is axially moved out of a standby position into a cutting position and back again or vice versa.

According to the invention, for the axial adjustment of the separating knife 15, which is superimposed on the rotational movement of the separating knife 15, only a knife shaft 16 carrying the separating knife 15 is moved relative to a housing 12 of the cutting head 11 of the knife assembly 10.

The or each processing step is advantageously carried out either in synchronisation or in a temporally staggered manner on both sides of the product by transporting along product being processed between two rotationally driven separating knives 15 of two cutting heads 11, 61 of the knife assembly 10 that are arranged on opposite sides of the product being processed. In principle, each separating knife 15 is held in a cutting position as a result of the knife shaft 16 that carries the separating knife 15 being moved out of the housing 12 in the axial direction by a spring force, each separating knife 15 for performing the processing cut first being moved axially into a standby position counter to the spring force by the knife shaft 16 that carries the separating knife 15 being moved into the housing 12 in the axial direction by means of compressed air, and each separating knife 15 being moved, owing to the reduction and release of the compressed air, back into the cutting position as soon as the product being processed is in the correct position in relation to the separating knife 15 in the transport direction T, by the knife shaft 16 that carries the separating knife 15 being moved out of the housing 12 in the axial direction by the spring force. The axial movement of the knife shaft 16 out of the housing 12 is achieved by the spring force, on the one hand, and is at least initially assisted by a restoring force generated by compressed air and acting in the direction of the spring force, on the other hand.

Particularly preferably, the method is used specifically when performing a backbone cut. For this purpose, a backbone cut is performed on a slaughtered, beheaded and at least partly gutted fish 100 using two separating knives 15 of the knife assembly 10 by transporting the fish 100 being processed, head-end first, into the region of the separating knives 15, which are in a cutting position, and moving the separating knives 15 away from one another counter to the spring force of a spring element 29 using compressed air before the backbone of the fish 100 arrives between the separating knives 15, and then moving said separating knives towards one another again, at least using the spring force, as soon as the backbone is located between the separating knives 15, and the separating knives 15 then sliding along the backbone in contact therewith at an adjustable and constant pressure as a result of the spring force. For this purpose, the transport device 63 and the or each working station 64, 66 to 70 are controlled by means of a control device.

The working principle of a knife assembly 10 according to the invention having two cutting heads 11, 61 can be summarised as follows. The cutting heads 11, 61 of the knife assemblies 10 are in a cutting position on either side of the transport path. This means that the knife shafts 16 having their separating knives 15 are extended maximally out of the housing 12 in the axial direction by the spring elements 29 and form a minimal distance between each other. Before a fish 100 being processed reaches the knife assembly 10, the slaughtered and gutted and usually beheaded fish 100 are transported head-end first, the knife shafts 16 having the separating knives 15 are moved apart from one another into a standby position by means of the compressed air, counter to the spring force of the spring elements 29, i.e. are retracted (away from the fish), in order to transfer the thicker end of the backbone, in the head region by comparison with the tail region, between the separating knives 15 and ensure that the backbone is received between the separating knives 15.

As soon as the backbone is located between the separating knives 15, the compressed air, or the feed thereof, is stopped and released so that the separating knives 15 can be moved towards one another by the spring force until they are in contact with the backbone. As the fish 100 continue to move through the knife assembly 10, the thickness of the backbone determines the distance between the separating knives 15. The return of the separating knives 15 out of the standby position into the cutting position can be assisted, and also accelerated, at least initially by a pulse of compressed air so that as little time as possible is spent transferring the separating knives 15 out of the cutting position into the standby position, and in particular out of the standby position into the cutting position, and accordingly so that as much time as possible is gained for performing the separating cut along the backbone. By combining or superimposing the spring force by the spring element 29 and the compressed-air-controlled adjustment force counter to the spring force and in the same direction as the spring force, very short cycles can be achieved, so in particular even small fish 100 of short length and low mass can be processed in a yield-optimised and precise manner.

Particularly preferably, the method is carried out using an apparatus 62 as disclosed herein, in which a knife assembly 10 or a plurality of knife assemblies 10 is used.

The invention claimed is:

1. A knife assembly for performing a filleting cut on a slaughtered, beheaded and at least partly gutted fish, comprising:

at least one cutting head, the cutting head comprising;

at least one housing having a knife unit;

a drive unit configured and adapted for rotationally driving a knife shaft rotatably borne inside the housing;

a separating knife arranged on a free end of the knife shaft for conjoint rotation;

wherein the knife shaft is axially movable relative to the housing and is configured to be decouplable from the drive unit for the purpose of axially moving the knife shaft in such a way that rotational movement of the knife shaft can be performed independently of the axial movement of the knife shaft.

2. The knife assembly according to claim 1, wherein the knife assembly is configured and adapted for performing a backbone cut on a slaughtered, beheaded and gutted fish that is fed to the knife assembly head-end first.

3. The knife assembly according to claim 1, wherein an adjustment force, or an actuator generating an adjustment force, is mechanically decoupled from the knife shaft in order to axially move the knife shaft.

4. The knife assembly according to claim 1, further comprising a drive sleeve arranged on the knife shaft, the drive sleeve beings operatively connected to the drive unit and to the knife shaft.

5. The knife assembly according to claim 4, wherein the knife shaft is arranged and guided inside the drive sleeve in an axially displaceable manner.

6. The knife assembly according to claim 4, wherein, a bevel gear of the drive unit is rigidly connected to the drive sleeve in order to rotationally drive the drive sleeve, and a driver element is rigidly connected to the drive sleeve in order to transmit the rotation of the drive sleeve to the knife shaft.

7. The knife assembly according to claim 6, wherein the knife shaft has a recess in which the driver element engages, the driver element being configured and adapted to transmit the rotational movement of the drive sleeve to the knife shaft and to ensure the knife shaft moves axially relative to the drive sleeve.

8. The knife assembly according to claim 7, wherein the knife shaft is configured at least in two parts each defining a knife shaft portion, the knife shaft portions being rigidly but releasably interconnected.

9. The knife assembly according to claim 8, wherein a first one of the knife shaft portions carries the separating knife, which is configured as a circular knife, and has the recess for the driver element, and a second one of the knife shaft portions is configured in a hollow-cylindrical manner, and a piston rod is arranged in a cavity of the hollow-cylindrical knife shaft portion, the hollow-cylindrical knife shaft portion being connected by the piston rod to the knife shaft portion carrying the separating knife.

10. The knife assembly according to claim 9, wherein the piston rod or a circumferential surface of the piston rod is arranged at a distance from an internal surface of the hollow-cylindrical knife shaft portion in order to form an air chamber, the piston rod tightly closing the hollow-cylindrical knife shaft portion at an end face on an opposite side to the separating knife.

11. The knife assembly according to claim 10, wherein the air chamber has at least one air flow opening to a surrounding area and is in flow communication with a compressed-air inlet to which a compressed-air unit is connected.

12. The knife assembly according to claim 11, wherein the compressed-air inlet comprises a rotary union for compressed air, the compressed air being controlled through the or each air flow opening into the air chamber and out of the air chamber.

13. The knife assembly according to claim 10, wherein, on a side of the knife shaft facing away from the separating knife, a second air chamber is formed between the end face of the hollow-cylindrical knife shaft portion and the housing and is in flow communication with a second compressed-air inlet to which a compressed-air unit is connected.

14. The knife assembly according to claim 6, wherein the drive sleeve is configured at least in two parts each defining a drive sleeve portion, the drive sleeve portions being rigidly but releasably interconnected.

15. The knife assembly according to claim 14, wherein a first one of the drive sleeve portions carries the bevel gear and the driver element, and a second one of the drive sleeve portions forms a clearance, in which at least a spring element is arranged, at least in some portions between the second one of the drive sleeve portions and a hollow-cylindrical knife shaft portion.

16. The knife assembly according to claim 4, wherein:

the drive sleeve is rotatably borne in the housing and is arranged in the housing so as to be stationary in the axial direction; and the knife shaft is movable relative to the drive sleeve in the axial direction, the knife shaft and thus the separating knife being held in a cutting position by a spring element when the knife assembly is in a starting position, in which cutting position the knife shaft having the separating knife is extended and pressed against a stop on the drive sleeve.

17. The knife assembly according to claim 16, further comprising an actuator for axially moving the knife shaft with respect to the drive sleeve, the actuator comprising a pneumatic unit operable to apply an adjustment force for axially moving the knife shaft counter to a spring force of the spring element in such a way that the knife shaft and thus the separating knife are held in a standby position, in which the knife shaft having the separating knife is retracted and pressed against another stop on the drive sleeve.

18. The knife assembly according to claim 16, wherein either the spring element is configured and adapted to be replaceable in order to vary the spring force, or the spring force thereof is configured and adapted to be adjustable.

19. The knife assembly according to claim 1, further comprising at least one lubricant outlet arranged in order to protect an axial adjustment region of the knife shaft, the axial adjustment region being in a region of the knife shaft in which the knife shaft emerges from the housing and carries the separating knife.

20. The knife assembly according to claim 1, wherein the knife assembly comprises two cutting heads.

21. An apparatus for filleting animal products, comprising:

a transport device for holding and transporting the animal products being processed in a transport direction along a transport path; and at least one working station along the transport path for processing the animal products;

wherein the working station comprises a knife assembly according to claim 1.

22. The apparatus according to claim 21, wherein the apparatus is configured for processing slaughtered, beheaded and at least partly gutted fish that are being transported in the transport direction head-end first.

23. The apparatus according to claim 21, wherein one cutting head of the knife assembly is arranged on either side of the transport path, the two cutting heads being configured to be controllable either in synchronisation or separately from one another.

24. The apparatus according to claim 21, further comprising a control unit which is configured and adapted for controlling the transport device and the or each working station.

25. The apparatus according to claim 21, wherein the transport device comprises a conveying means, which is configured selectively as a conveyor belt, a double conveyor belt, a conveyor chain comprising holding means, a spike chain conveyor or an overhead conveyor system.

26. The apparatus according to claim 21, further comprising a plurality of additional working stations arranged along the transport path, the additional work stations being arranged either upstream or downstream of the at least one work station having the knife assembly.

27. A method for filleting animal products, comprising the steps of:

feeding the animal product that is to be processed to at least one working station by a transport device in a transport direction;

performing a processing cut on the animal product being processed, using a knife assembly as a working station, by transporting the animal product being processed along at least one rotationally driven separating knife of a cutting head of the knife assembly;

the rotating separating knife being axially moved out of a standby position into a cutting position and back again or vice versa in order to be positioned in relation to the animal product being processed;

wherein axial adjustment of the separating knife is superimposed on the rotational movement of the separating knife by only a knife shaft carrying the separating knife being moved relative to a housing of the cutting head of the knife assembly.

28. The method according to claim 27, wherein the processing steps are carried out either in synchronisation or in a temporally staggered manner on both sides of the animal product by transporting the animal product being processed between two rotationally driven separating knives of two cutting heads of the knife assembly that are arranged on opposite sides of the product being processed.

29. The method according to claim 27, wherein each separating knife is held in a cutting position as a result of the knife shaft that carries the separating knife being moved out of the housing in the axial direction by a spring force, each separating knife for performing the processing cut first being moved axially into a standby position counter to a spring force by the knife shaft that carries the separating knife being moved into the housing in the axial direction by compressed air, and each separating knife being moved, owing to a reduction and release of the compressed air, back into the cutting position as soon as the animal product being processed is in a correct position in relation to the separating knife in the transport direction, by the knife shaft that carries the separating knife being moved out of the housing in the axial direction by the spring force.

30. The method according to claim 29, wherein the movement, induced by the spring force, of the knife shaft carrying the separating knife out of the standby position back into the cutting position is assisted at least initially by compressed air.

31. The method according to claim 29, wherein a backbone cut is performed on a slaughtered, beheaded and at least partly gutted fish using two separating knives of the knife assembly by transporting a fish processed, head-end first, into a region of the separating knives, which are in the cutting position, and moving the separating knives away from one another counter to the spring force of a spring element using compressed air before a backbone of the fish arrives between the separating knives, and then moving said separating knives towards one another again, at least using the spring force, as soon as the backbone is located between the separating knives, the separating knives then sliding along the backbone in contact therewith at an adjustable and constant pressure as a result of the spring force.

32. The method according to claim 27, wherein the transport device and the or each working station are controlled by a control device.

\* \* \* \* \*